United States Patent [19]

Herzberg et al.

[11] Patent Number: 5,202,921
[45] Date of Patent: Apr. 13, 1993

[54] METHOD AND APPARATUS FOR AUTHENTICATING USERS OF A COMMUNICATION SYSTEM TO EACH OTHER

[75] Inventors: Amir Herzberg, Ramat-gan, Israel; Shay Kutten, Rockaway, N.J.; Marcel M. Yung, New York, N.Y.

[73] Assignee: International Business Machines Corporation, Armonk, N.Y.

[21] Appl. No.: 678,474

[22] Filed: Apr. 1, 1991

[51] Int. Cl.⁵ .............................................. H04K 1/00
[52] U.S. Cl. ...................................... 380/23; 380/25; 380/21
[58] Field of Search .................. 380/21, 23, 24, 25, 380/28

[56] References Cited

U.S. PATENT DOCUMENTS

| | | | |
|---|---|---|---|
| 4,219,151 | 8/1980 | Haruki | 380/23 X |
| 4,720,859 | 1/1988 | Aaro et al. | 380/23 |
| 4,987,593 | 1/1991 | Chaum | 380/25 X |

OTHER PUBLICATIONS

"Advances in Cryptology"; Proceedings of Crypto 82; Ronald L. Rivest & Sherman, Alan; Plenum Press; 1982 pp. 231-235.

*Primary Examiner*—Tod R. Swann
*Attorney, Agent, or Firm*—Pollock, Vande Sande & Priddy

[57] ABSTRACT

Method and apparatus for authenticating users (entities) of a computer network based on the entity's identification is described. Keys for each party of a potential session are derived by projections stored at each party's location. The projections are based on a partially computed function which can be in encryption by some key of the user identification or a multivariable polynomial or other function which is partially evaluated for one user's identification. Each user evaluates his projection with the other user/party's identification. The evaluated quantities are compared using a validation routine. The method requires only one basic piece of information, the projection to be distributed to each user, and does not need specific keys for specific users (or other users' information stored in one user's memory or global network). The method enables adding users to the system directory in a flexible way, without having to notify users of the addition. The method applies to communication heirarchies and inter-domain communication, as well.

20 Claims, 4 Drawing Sheets

METHOD AND APPARATUS FOR AUTHENTICATING USERS OF A COMMUNICATION SYSTEM TO EACH OTHER

BACKGROUND OF THE INVENTION

The present invention relates to a computer network having multiple users. Specifically, method and apparatus are described which permits parties to a session or conversation in a connectionless exchange on the network to authenticate the other parties' status as a valid user who possesses the name he/she claims.

In the communication protocols which permit two parties to communicate over a common communication network, various techniques are employed to authenticate parties to each other. These procedures for authenticating the parties to a proposed session over the network screen out any party which either does not have the status of a valid user, or who may have lost his status as a valid user, or is a valid user under a different name than the one he claims to be.

These systems typically employ the use of electronic keys, possession of which identifies a user/party as being a valid user/party. The lack of possession of such a key would indicate that the user is not the one he claims to be, and is denied communication with another user/party over the network. These keys are often manually installed at the party's/user's secure memory storage to initially authorize the party. Each party generally stores N-1 keys where N is the total number of parties with which it may need to communicate. At the system generation phase, all potential parties to a session have to be known and the key shared between pairs of parties has to be safely and securely stored at each party's location. These keys are maintained through a system of bookkeeping, which identifies that possession of the particular key is the test to show that this party is the one he claims to be, authorized to communicate with a specific second party. The key itself does not effectively identify a party except from the bookkeeping.

The total number of keys required per party, and the further requirement that there be a global knowledge of all possible parties to a communication is a disadvantage in these systems. In order to avoid these disadvantages, several proposals have been made in the past. One of these systems is a so-called public key system attributed to Diffie and Hellman. This system, although believed to be secure, has risks that, given sufficient mathematical execution time, the security of the system may in fact be compromised. Further, the system for generating a key is computationally intensive. The public key system is essentially an encryption system, wherein each party holds two keys, one a publicly-known encryption key designed by a given authority and listed in a common directory, and the other a private decryption key. This system is basically adverse to the desirability of limiting the number of keys which must be distributed to each party.

Another system which is identified as being proposed by Needham and Schroeder provides for a three-party system, wherein a server is one of the parties, and dynamically distributes common keys to each pair of parties. In this system, each party stores a single key which is shared with its connected server. To initiate a communication between the parties, the initiating party must go first to the server to obtain keys to be used by the pair. Although it achieves one objective of minimizing the number of keys in the system, and the number of keys needed to be stored in each of the party's locations, it requires extensive communication with its server, thus burdening the network and server.

The connectivity to a server is not always practical in light of the additional cost and burden to the network traffic, and the possibility of link failure in the network.

In a paper by Rolf Blom, published as part of the advances in cryptology *Proceedings of Crypto* 82, pages 231 et seq., a method to encrypt messages transmitted in the network was proposed by supplying a key of M bits. The derivation of such encryption keys included assigning a unique user number to the users of the networks, and then with the unique user number, permitting that user to calculate a key based on his/her unique number and the unique number of another using a polynomial function. Blom's technique employed the use of a shared secret polynomial. Each user knows its share, but none knows the whole secret. Thus, the user knowing only partial information respecting the original polynomial is capable of generating an evaluation of the polynomial, using information supplied by the other party. The resulting key is used to encrypt the messages to be sent to the other user/participant in the communication session.

At the same time, the other user also receives the polynomial evaluated for his unique number I. This will permit this other user to calculate a similar key which will be identical to the key evaluated by the first user. Thus, each side has a key for encrypting and decrypting a message.

This method of sharing by polynomials has been used in the literature for various purposes, none of which includes authentication.

The process of encrypting entire messages for sending across a common network may also involve more security than is actually necessary. Using the key to encrypt all messages creates a risky exposure of the key-overusage. Therefore, it would be desirable to provide a secure method of authentication which did not require complete encryption of all messages, but yet had a limited number of keys needed to be stored at each party's location.

SUMMARY OF THE INVENTION

It is an object of this invention to provide a system for authorizing users/parties to communicate over a computer network.

It is a more specific object of this invention to provide a system of user/party authorization which requires a minimum number of keys to be distributed to the users/parties of the system. In particular, keys given to users do not include information about other users/parties, and new users/parties can be added to the system dynamically without notifying other users/parties.

It is yet a more specific object of this invention to provide for key generation at a user location which is semantically bound to the identity of authorized users/parties where "identity" is a general term capturing the user status by name and contextual information.

These and other objects of the invention are provided by a system and method which utilizes a system function, which may be a polynomial, for generating keys for each of its users based on an evaluation of the function using as one variable the user's identity. By user, it is meant to include all possible parties to a communication session, recognizing that applications running in a node, or a server, for instance, may need an authentication protocol who are not strictly "users". In a preferred embodiment of the invention, a polynomial is selected having an order higher than the number of users expected to be in the system, or the number of malicious users that are expected to cooperate in order to break the system. Observing this relationship makes it impossible for any number of users to pool their information so as to derive the system polynomial. Alternatively, the polynomial can be replaced by a more generalized function, e.g., a polynomial divided by another polynomial, matrices encrypted data, and so forth. This function regardless will be referred to as a polynomial.

In a basic application of the invention, the system polynomial is symmetric and has two variables. The two variables identify the participants to a proposed session on the communication network. Each party receives from the network administrator the value of the polynomial evaluated for its own identity, leaving undetermined the second variable representing a user that may be a party to a communication link; this partially evaluated polynomial is called a projection.

When two such parties wish to communicate with each other, they evaluate their projection, which is a polynomial in one variable, for the other party's identity in the other variable. In doing so, the same numerical result is obtained by both parties, constituting a key for the parties. The parties then validate the key computations by comparing the two keys which each has computed. Assuming that an appropriate validation is obtained, indicating that each party has calculated the required key, then the parties are deemed by each to be authorized users of the network, and having the names they claim. The validation procedure is a known procedure which is a protocol which requires only a few applications of the computer keys on certain random challenges, and does not necessarily involve encryption of long messages. Validation can also be performed by using the calculated key to encrypt or devise a new computer key which is then used in the validation process.

In still another embodiment of the invention, an asymmetric polynomial is selected. Projections of these polynomials are determined by evaluating for one variable the identity of each user, and each user receives such a projection. However, parties to a proposed communication link will only obtain the same key when these parties are of different classes. In this way, a user can be foreclosed from communicating with anything but a server, or other communication hierarchy imposed on the users.

Further, using the foregoing principles, it is possible to have multiple levels arranged in a hierarchy such that, for example, a two-level authority is provided. In this system, a polynomial of more than two variables is proposed wherein a higher authority gives a projection in one variable to a lower authority, which in turn transfers a second evaluation of this projection, i.e., further projections of the projection, to users which are under the direct control of the lower authority. In this way, a plurality of servers may serve as a secondary authority, giving to a group of users associated with the server a projection calculated for the particular server, and which will permit users of that server to intercommunicate, or communicate with users of another server.

A lower level server can belong to another network. By revoking authorization of the lower level server, it is possible to also revoke the authorization of the users connected to the lower level server.

Using the foregoing system of projections of a secret polynomial, it is possible to provide internetwork authorizations. Where two independent networks exist, organized by different entities, it is possible for those entities to permit others outside the network to use the network by supplying only projections of a secret polynomial to those outside the network. As the projections will permit communication from outside the network, it is possible for all security to remain with the particular network administrator and avoid the disclosure of any secret polynomial information which the network owner wishes to maintain secret.

In yet another embodiment of the invention, a system is proposed for letting users who wish to communicate only to servers to receive a key for intercommunicating with servers. The main merit of this "subset" method is that any number of users cannot imitate another user or server. In the other embodiments, a parameter of the method is the number of users that should not be able to break the method, but a larger number can. In this subset method, a server would have received from a system administrator a plurality of keys, possibly based on the server's identity. A user communicating with the data base server would get projections of all keys of a system evaluated for that user's name. Thus, to authenticate a user, the data base server need only compute evaluations of the keys the server has on the user's name which a server has obtained. The user evaluates each of the projections, corresponding to the keys held by the server, using the server's name to derive a key. By comparing each of the computed keys at each location, either as a logical combination or individually, it is possible to determine whether or not a given user has authority to communicate with the data base server. Comparison of computed keys is done as before by known procedures. If the set of keys is selected according to the server name, then the user can also authenticate that this indeed is the server with this name.

Other embodiments of the invention include a further encryption of the secret information held by a user in memory storage by virtue of the user's password. Thus, when the user receives this data, it has been encrypted in accordance with the user password which does not accompany the hardware on the network. Only after the user has decrypted the secret information with the password can the authorization proceed to a successful conclusion.

DESCRIPTION OF THE PREFERRED EMBODIMENT

Figure 1:
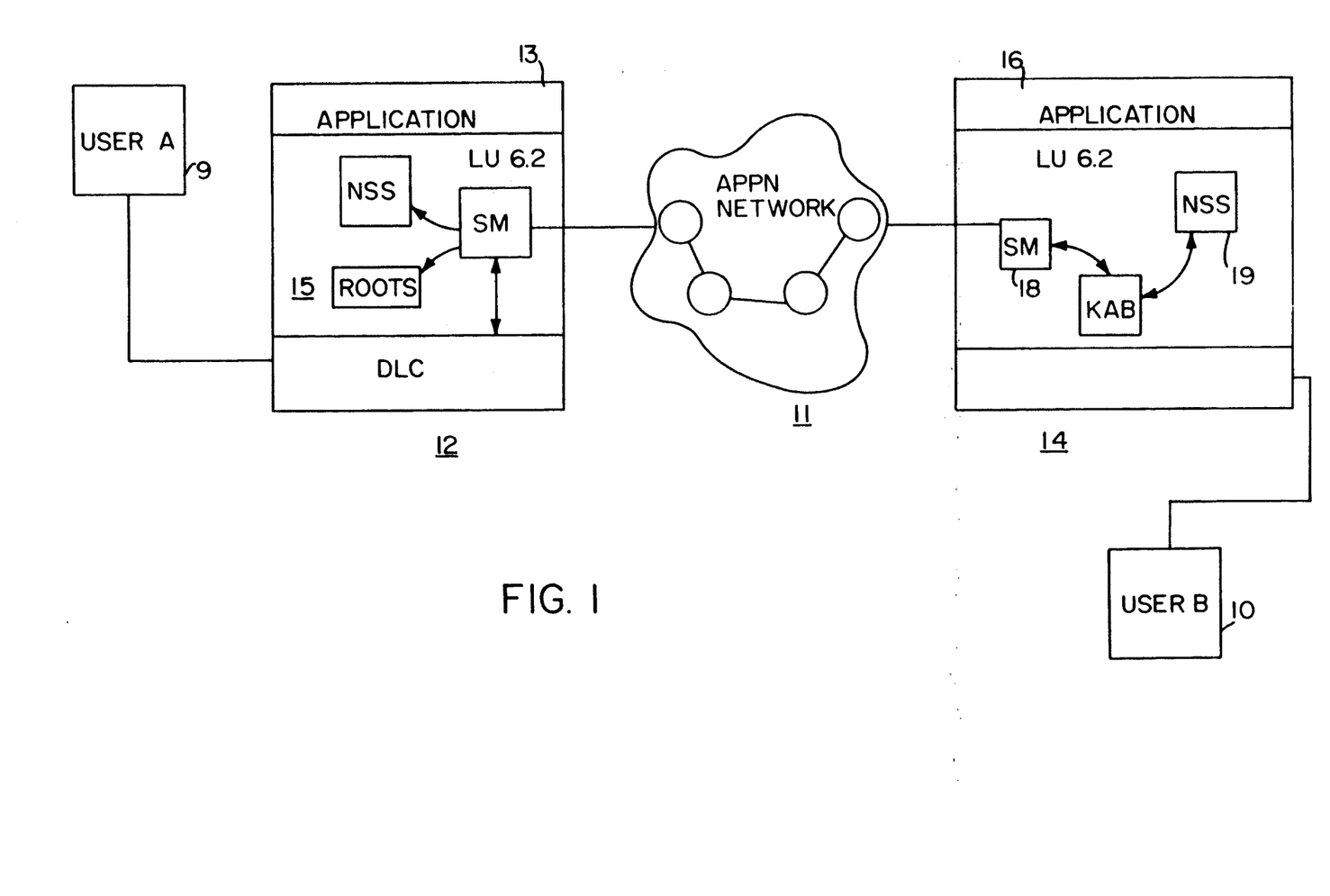
FIG. 1 illustrates a typical network scenario in which a user connected to one node of a communication network wishes to establish a session with a user in a second node of a communication network. In each node, there is a logical unit (LU 6.2) acting on behalf of users at that node, using a security manager (SM) to handle keys and encryptions.

Referring to FIG. 1, there is shown a typical scenario of a user A having a terminal 9 connected to a node 12 of an APPN network 11. The user A has access to the network 11 through the communication software at node 12. An APPL application 13, associated with the node 12 permits communication between the user A through the APPN network 11 through communication software at node 14 to the application 16 of the node 14. As is schematically shown, the APPN network 11 includes various nodes which route traffic between applications of a respective node in communication with another node.

In order to limit access to the APPN network 11 to authorized users only, a common key KAB may be given to each pair of the users, permitting each user to be authenticated by any other user or application running in a distant node 14. Again, the user A and application 16 can each be thought of as parties to a communication, and need to authenticate each other. The distant node 14 will authenticate the user A connected to the node 12 by issuing a challenge to the node 12. The security manager 18 of node 14 will randomly select a number and forward the selected number challenge to the node 12. The number challenge is encrypted by the node 12 according to its key KAB, and forwarded back to the node 14. Security manager 18 of node 14 will also encrypt the randomly selected challenge in accordance with the key KAB stored in memory 19. If node 14 receives an encrypted word identical to the one it encrypted, this can serve as authentication that the user A, connected through node 12 also possesses the key KAB and is authorized to communicate over the network, since without the key it is impossible to answer the challenge in a reasonable time.

Using this scenario requires that the nodes each store the common key of each pair of users. This key pair is unique to each of the pairs of users of the network and as was noted in the background of the invention, provides considerable overhead to a large network having many potential pairs of parties to a communication.

In one embodiment of the invention, the generation of such keys is done locally based on projections (functions) of the keys given by a network supervisor, such projections requiring substantially smaller amounts of storage than pair keys. Each user can compute a key which is unique to the user and a potential party to a communication. The computed key is semantically bound to each of the potential parties to the communication, in the sense that had the party name been different, it would have computed a different key.

In accordance with the preferred embodiment, to derive a key for each pair of users that wish to communicate over the network, the users are given a projection of a partially evaluated polynomial. In the simplest example, the system may have a symmetric two variable polynomial P(X,Y), where X and Y represent the identity of two potential parties to a communication. This polynomial can be calculated in a finite field, for example 56 bits. All evaluations are therefore performed in modulo $2^{56}$ which guarantees that all the values are valid DES keys.

For example, the following polynomial may be selected:

$$P(X,Y) = a_{00} + a_{10}(X+Y) + a_{20}(X^2+Y^2) + a_{11}(XY) + a_{12}((X^2Y)+Y^2X)) + a_{30}(X^3+Y^3)$$

The system administration evaluates the polynomial assigning for one of the variables, X, the user's identity or some other semantic quantity related to that user, and provides the partially evaluated polynomial (not evaluated for Y) as a projection to that user. The other user receives the polynomial evaluated for X, assigning to X the identity of that user. Thus, to define the particular key shared with another user, the projection need only be evaluated for the single remaining variable. That is, each of the users evaluates its projections further by assigning the name of the other user to variable Y.

The uniqueness of this proposal is that each party may derive keys from a single secret projection which it receives from the system administrator, and which the administrator has bound to the semantics of the party's identity by evaluating a projection of the polynomial from the party's identity. The evaluated projection will define keys for any other party to the network. The key is computed by substituting the identity of the other party in the polynomial for the unevaluated variable Y. Unless a party has received a projection, evaluated for its own identity or other semantic quantity associated with this party, it will not be able to compute the correct key and the challenge noted previously will not be successful unless both parties have the identical key.

The advantage of the foregoing principle of supplying partially evaluated projections to each party, permitting that party to compute a unique key with any other party, lies in the security of the system. In the event a polynomial is selected having a degree of each variable greater than the number of users N (or greater than the number of users ever to contact each other), it is mathematically impossible for all the users to compile their individual projections to discover the basic polynomial which is used to derive the projections or to derive a projection of any other party. Thus, the security of the system is mathematically 100%. Alternatively, the degree of the polynomial may be selected to be less than the local number of users, but greater than any expected number of malicious users who may cooperate in an effort to discover the system polynomial.

The foregoing system can be demonstrated as follows: if two users A connected to the node 12 through terminal 9 and B connected to the node 14 through terminal 10 receive projections, these projections can be identified as follows: P(A,Y) and P(B,Y). This represents the state of knowledge by each of the parties prior to attempting a communication. Each party now has a projection which he can authenticate with any other user who has a projection on his name.

Suppose user A joins the network first, and then at a later time, user B joins. A central property of this system is that adding a new member (user B) can be done without ever notifying the already existing party. Thus, this method does not need a central directory or network as other key systems require.

Once a session is attempted by the logical unit 6.2 based on the identity of user A, the system manager of node 12 will compute an evaluated key, based on the identity of the party B, for which a communication is being established. This key will compute as $KAB = P(A,Y)$ calculated at B, that is $P(A,B)$. At the same time, the security manager 18 of node 4 will compute a key based on the known information represented by the projection $P(B,Y)$ substituting for Y the identity A of a user which he knows is attempting to communicate with the node 14, and the application 16 and any user B connected thereto.

As can be seen from the foregoing polynomial, these projections will compute to the same key, such that $[KAB = KBA] = P(A,Y)$ at $Y = B$ $KAB = P(B,Y)$ at $Y = A$) since the polynomial is symmetric in X and Y. Thus, each side will therefore compute the same key and the foregoing challenge may be carried out successfully, verifying that each party possesses the common key.

The foregoing example of a symmetric polynomial $P(X,Y)$ to generate the secret projections for each of the users may also be implemented using an asymmetric polynomial which, in some circumstances, offers advantages not realized using the symmetric polynomial. For example, using an asymmetric polynomial, a protocol may be implemented wherein one party must always be a server and the other a user in order to derive a common key. Users will not be able to claim to be servers and cannot communicate with each other, but only with a server.

This asymmetric polynomial will provide for the circumstance wherein $P(A,B)$ is not equal to $P(B,A)$. This property permits assigning the first variable to one type of party, i.e., such as a server. The second variable may be reserved for users of a second type. In this way, the hierarchy can be preserved to permit communications only between two different classes of users rather than among users of the same class.

Figure 2:
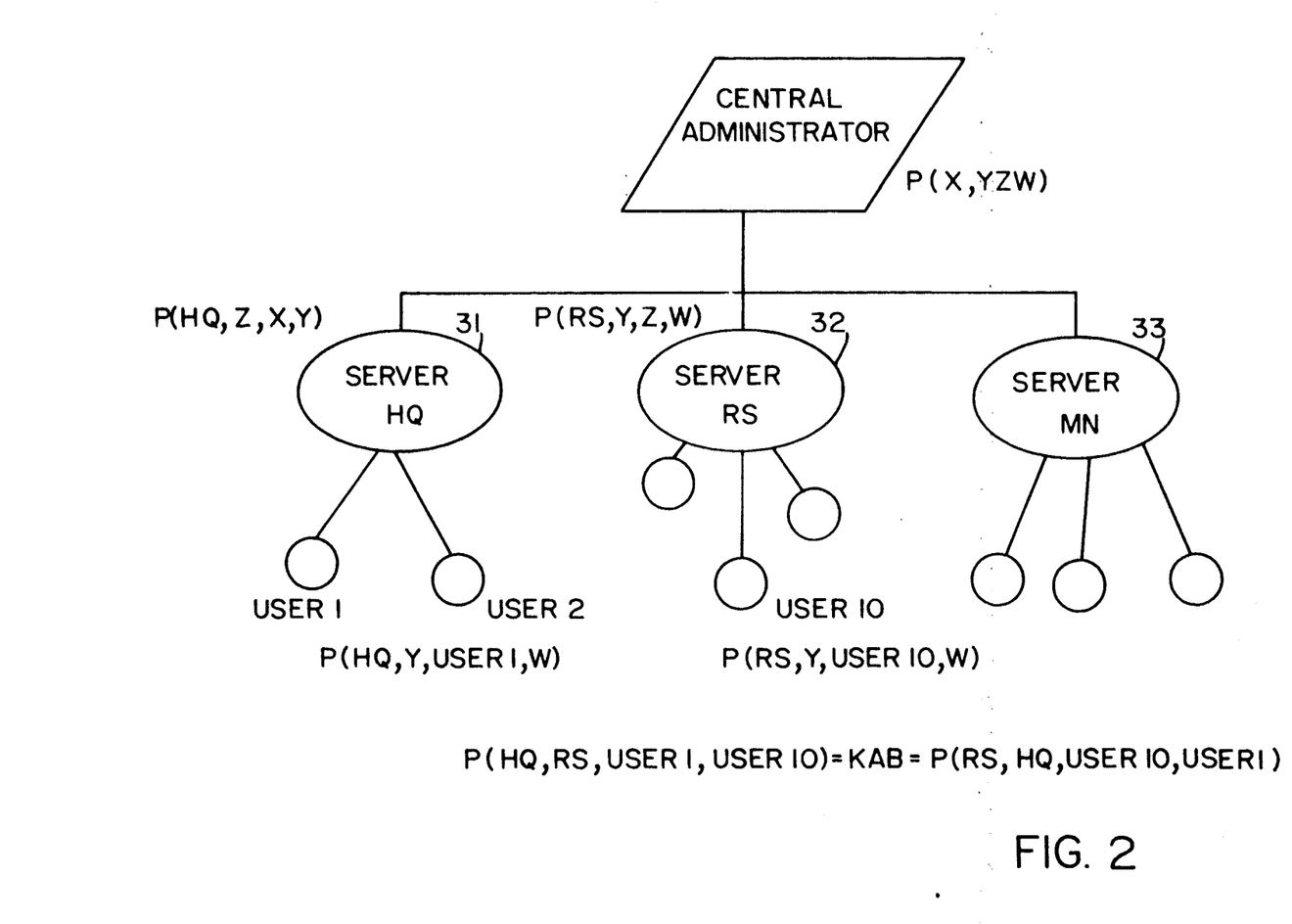
FIG. 2 illustrates how a four-variable polynomial may be used to establish a multiple server hierarchy for a plurality of connected users to each server. T, Z, X and Y are variables of the polynomial; HQ, RS and MN are server names; User 1, User 2 and User 10 are user names.

FIG. 2 illustrates a system which permits two levels of hierarchy. In the illustration, there is shown a central authority which has a secret 4-variable polynomial. The central facility may issue a projection of the 4-variable polynomial $P(X,Y,Z,W)$. Each of a plurality of servers is identified by one of the values. In a practical scenario, the central facility may be a company control authority for a network which is served by a plurality of servers, each in turn being connected to a plurality of users. The first server could be located at a headquarters installations (HQ), whereas the second at a research location (RS), and a third at a manufacturing location (MN). The first of these servers 31 will receive a projection comprising the polynomial evaluated for one of the variables, HQ. This then will leave the server with a projection having three remaining variables to be assigned.

In operation, a user associated with one of the servers will receive its projection from the server evaluated for two of the variables, one being the variable associated with the server, i.e., HQ RS or MN and evaluated for the user's ID. The projection received by a user of server HQ can be represented as:

$$P(HQ, . , USER ID, .)$$

Each of the users having received a projection evaluated for its server identity HQ, RS, MN and its particular user ID will then be able to communicate with any other user connected to any other server by performing a key evaluation. For instance, assuming a user connected to the HQ server wishes to communicate with a user (party) connected to the research server RS, the key KN will be evaluated by the first user as follows:

$$P(HQ, RS, USER ID, PARTY ID)$$

This polynomial is evaluated for the two additional quantities PARTY ID representing the party (user 10, for example) for which a session is desired and the server RS connected to that party which in the example is RS, whre $Y = PARTY ID$ and $Z = RS$. Similarly, the RS server has provided its users with a partially computed polynomial in accordance with $P(RS, ., USER ID, .)$. The user associated with the RS server will evaluate his projection, using the identity of the party attempting to establish a link as the variable Y and with the identity of the server HQ serving that party for Z, as the two missing quantities of the projection. The polynomial is symmetrical in X and Y and also symmetrical in Z and W. Thus, the same computation is effected for the second user (i.e., the party who was called) of the proposed session. A key is obtained by this user which must be validated to determine whether or not the key is the same as the key compiled by the other party to the session.

Intercommunication between users connected to different servers may be effected. The individual servers will in this scenario have control over the projection which each of its respective users gets for determining their key.

The foregoing description with respect to FIG. 2 permits a central facility having access to the secret polynomial to authorize subservient servers to issue projections to respective users to permit the generation of keys by these users. One advantage of this method is that each of the parties can know which is the server that gave the projection to the other party. This can be useful, e.g., in this case, that one of the servers (or the corresponding class of users) becomes untrustworthy. Alternatively, if a user is caught deriving something illegal, it can be determined which server authorized the offending user.

Figure 3:
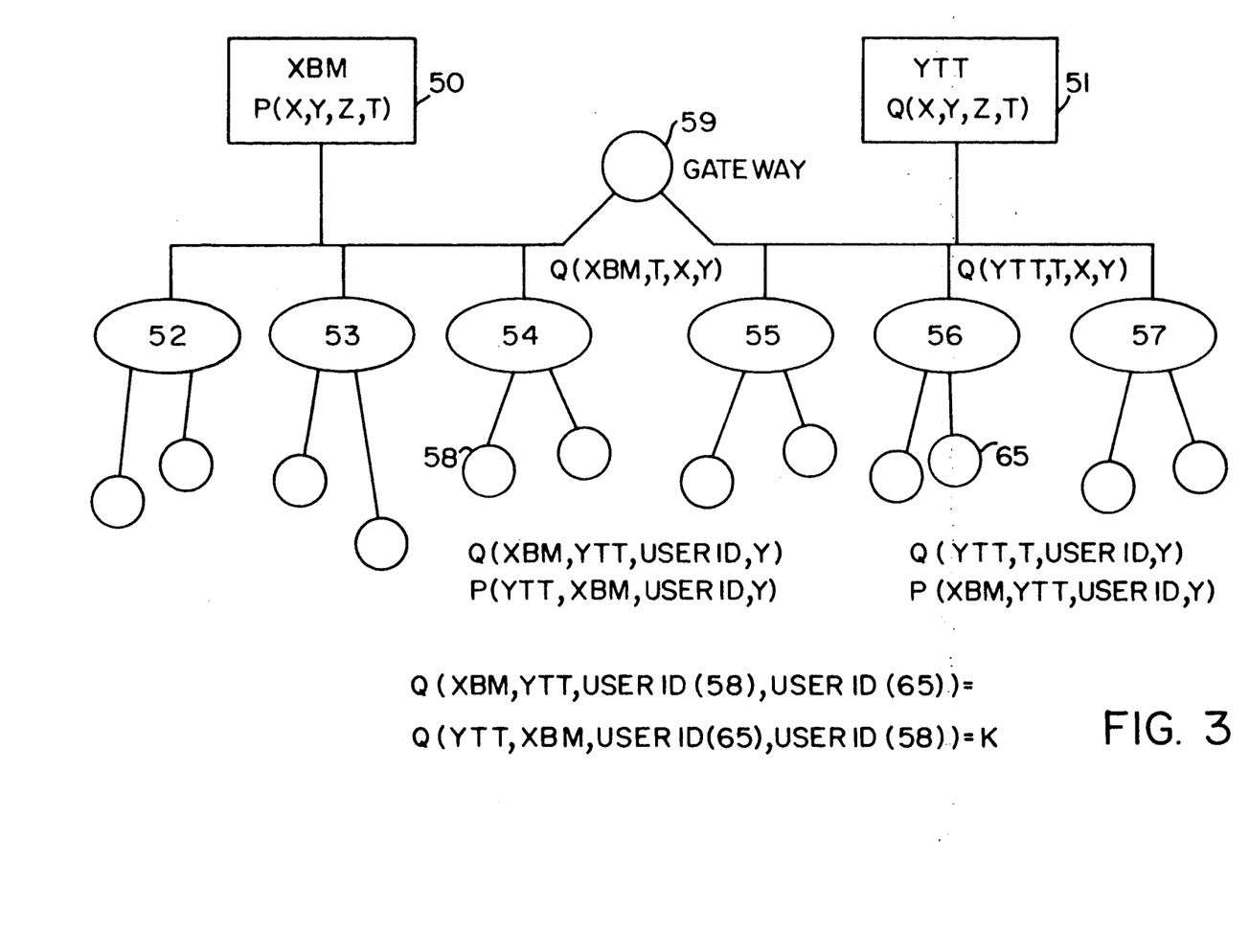
FIG. 3 illustrates how the foregoing principles may be applied to internetwork communication wherein different entities control the respective secret information needed to compute a key common to users of different networks.

In yet another variation on the use of the foregoing inventive concepts for generating keys among users of a communication network, FIG. 3 illustrates how independent networks which do not wish to share secret polynomial information with other independent networks may still authorize such independent networks access to their network. In a competitive scenario, as is shown in FIG. 3, two entities, identified as XBM and YTT, have their own network in which they generate polynomials and projections of polynomials which identify the keys for users of the network. It is possible to have the network controller of each independent network provide evaluated projections of its secret polynomial, evaluated in one variable, to servers of the other network. Shown in FIG. 3 is a central authority for each network, one representing the central authority for YTT, the other the central authority for XBM. These entities each have a secret polynomial, $P(X,Y,Z,T)$ for XBM and $Q(X,Y,Z,T)$ for YTT.

A first level of servers 52-54 and 55-57 are associated with each of the independent networks 50, 51. These servers may be interconnected to the other network, and receive two projections of polynomials, i.e., the polynomial projection in three variables, the first of which represents the polynomial Q for the YTT network 51 and the second of which represents P, the polynomial for the XBM network. Users of one network who wish to communicate to a user in the second network via gateway 59, evaluate a projection originating from the second network. The user 58 who received his projection from an XBM network server 54 receives a Q projection evaluated for one variable, XBM, evaluated for its own identity 58 and not evaluated under the two additional variables corresponding to the user it will speak to and that user's server, i.e., the identity of the user of the YTT network with which a conversation is desired. This is represented as Q(XBM, USER1, ). Similarly, the second user 65 to a proposed session receives from server 56 the Q polynomial projection evaluated for his network YTT, and his own identity. This is represented as Q(YTT, USER2, ). When the users wish to speak, they will exchange their identification numbers and the name of their network. Each user will then evaluate his projections for the other's ID, the only unknown of his projection. Thus, each projection evaluated by the two users 58, 65 interconnected to different networks results in the identical key being computed. As with the earlier example of two nodes of FIG. 1, the challenges are issued from one user 58 to user 65, using each of the keys to determine whether or not both users have the same key. Should user 65 initiate an attempt to communicate with user 58, a pair of projections P, based on the XBM network 51 polynomial, can be used or the same Q projection as before, or a function of them.

The foregoing example illustrates how proper key distribution can be enforced without giving the ultimate polynomial secret to other users in other networks. Users may communicate within their own network by using a second polynomial projection issued by its own control authority. Also, it can be seen which network or server gave the user its polynomial. This is useful in the case that the server turns malicious.

The previous examples illustrate a minimal number of variables associated with each secret polynomial, these variables identifying the parties to a proposed session over a communication network. It is possible to add to the polynomial yet other variables, e.g., one perhaps representing a time stamp. The polynomial is therefore evaluated at a specific date. The entity using it, such as the user, will not only supply the identity of the party to its projection with which it wishes to communicate, but must also provide the specific date it received the projection. At a later time, the network authority could issue other projections based on later dates. This would effectively screen out users who have been dropped from the network since that user will have a projection evaluated for the wrong date. This is termed revocation of a user's authority.

It is also contemplated in these systems that as an extra measure of security the users can receive their projection via a smart card inserted into their connected processor. The projection may be encrypted by a user password, and thus the smartcard stored projection would be unintelligible to anyone not having the user password. Upon configuration for the first time, the user would decrypt the projection in accordance with the known password and obtain the decrypted projection for use in calculating the key in accordance with the foregoing principles. The calculations may be performed on the smartcard as well.

Figure 4:
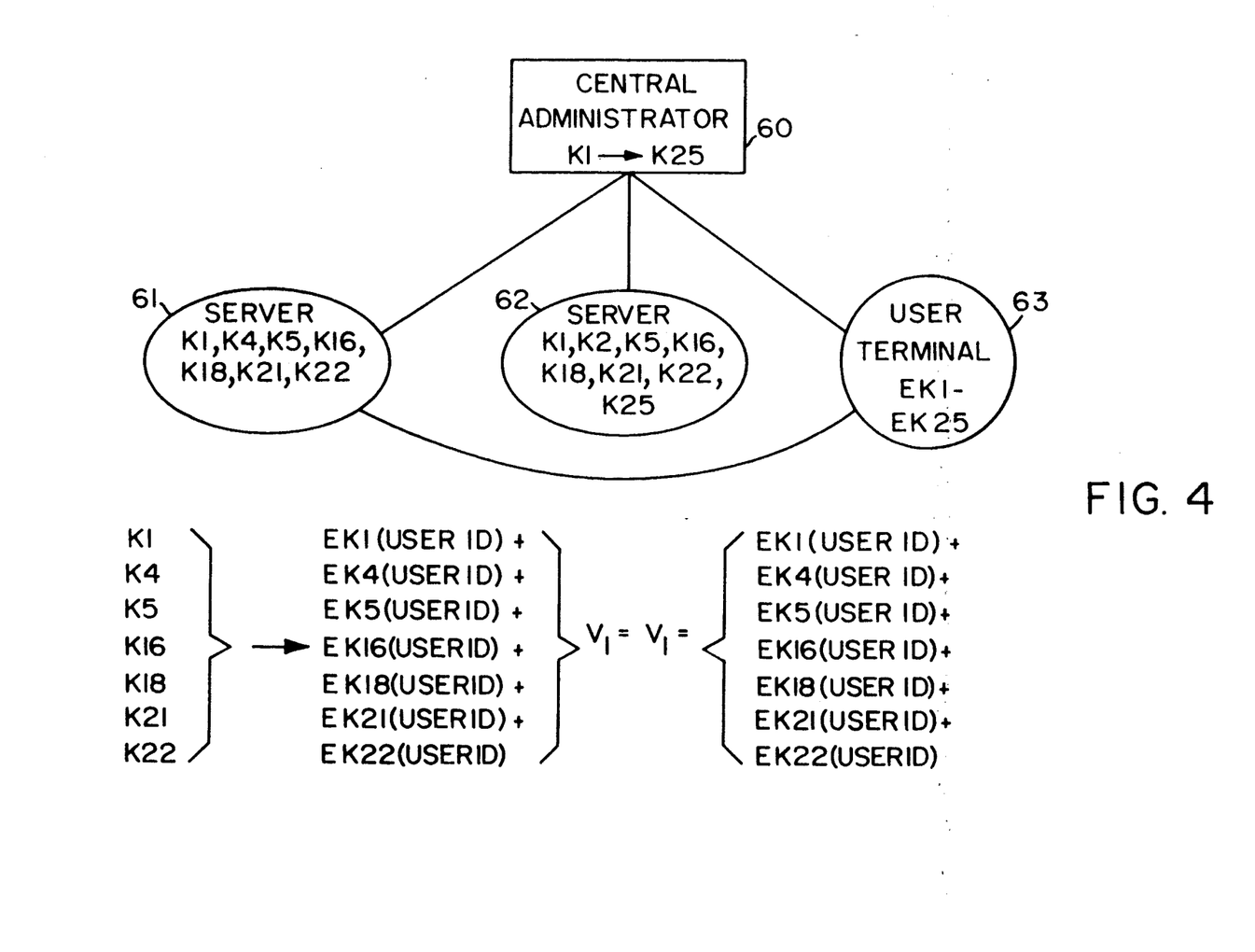
FIG. 4 illustrates a variant of the embodiment wherein keys are generated using a user's name or characteristics through the use of sets and subsets of keys known to one party and a set of projections known to another party, e.g., $EK_1$ is encryption using the $k_1$ key; $Ek_1(V)$ is the value encrypted under the $k_1$ key.

As yet another variation of the inventive concept, FIG. 4 illustrates a center 60 which may have a plurality of keys for verifying the authority of a user. These keys may be secret polynomials for computing a key shared between two users, or any cryptographic keys such as DES keys. This method is based on servers possessing subsets of keys.

The illustration of FIG. 4 includes two servers 61 and 62. Server 61 could be in a practical implementation a data base server having a plurality of such keys, but not all of such keys. Shown are keys 1, 4, 5, 16, 18, 21 and 22. A user which will potentially communicate with the server 61 includes projections or evaluations of all the keys of the center, evaluated or encrypted for that user's name (V), i.e., identification. Thus, to authenticate the user's access to the data base server 61, the user 63, which may be a terminal, can use each of its projections evaluated for its name (V). However, it will use only the projections of those keys possessed by the server 61. These plurality of projections may be added together to derive a final key, V1. On the other side, the data base server 61 will calculate from its keys the value of the projection of the keys for the user's 63 name, i.e., identity. These keys similarly must be added together to derive the common shared key V1.

In the foregoing system, it requires knowledge on the part of the user 63 of which keys are possessed by the data base server 61 or 62 in order to determine which of the projections of the user are to be added together to derive the common key. As the data base server 61 only includes certain keys, it can only compute certain of the projections which the user has. The set of keys (1, 4, 5, 16, 18, 21, 22) can be a function of the server's name.

As with the previous embodiment, the user may receive his shared secret information, i.e., projections from a preprogrammed smart card. The projections may be password encrypted.

Once the common keys have been determined by each of the potential parties to a communication, the challenge may be issued using these keys and a verification determined that the user is appropriately authorized to communicate to the data base server (using verification protocol).

As with the polynomial method, the server 61, 62 may incorporate as one of the variables in the projection a time value. As a refinement of this method, it is possible to have the user evaluate the projection under the time variable, using the time in which the keys were distributed to the server, as well as his identity. Thus, built into the key for the user is a time function which was used to evaluate the key which generated the evaluation. The more trusted party, in this case the server, can verify the time for any user, normally less trusted. After a certain time period, the projection will expire and new projections may be issued by the servers to users, thus removing users whose status has changed to unauthorized. Another way to do it is to do another evaluation at the time of distribution of the new keys to the server. It is also possible to use the key to encrypt the time and give it to the user as an additional value to add to his polynomial. This represents a combination of the polynomial and subset methods. This extra key is given to the servers. During validation, the user can tell the server the time, the server can compute the encrypted time from its key, and get the same value which was given to the user. This value can be X/ORed with the polynomial value, giving a common key for both user and server.

The examples given represent a scenario between users connected to a network and servers of a network. It should be recognized that users and servers constitue a species of party. Other parties such as an application running in a node, or any other communications entity in need of an authentication protocol, may use the invention.

It is therefore seen that using the foregoing system it is possible to provide security to users of a network which is to a certainty unbreakable (i.e., unbreakable given local information to derive other user's keys). Other embodiments of the invention will be recognized by practitioners in the art.

Having thus described our invention, what we claim as new and desire to secure by Letters Patent is:

1. In a communication system having a plurality of parties, a method for each party to authenticate another party comprising:
    generating a system function in at least two variables, said function two variables representing the identity of first and second parties;
    transferring to each of the parties a projection of said function solved for a respective party's identity;
    evaluating at said first party's location said projection with the identity of said second party to obtain a validation number, when said first party needs to authenticate said second party;
    evaluating at said second party's location said second projection with the identity of said first party;
    comparing at each party's location the evaluated projections, and determining based on said comparison the authenticity of each party.

2. The method of authenticating of claim 1 wherein said function is a polynomial having an order greater than the number of system parties preventing said parties as a group from deriving said polynomial, or its projections outside said group.

3. The method according to claim 2 wherein said polynomial is selected so that each pair of parties produces a common evaluation of their projections.

4. The method of claim 1 wherein said function is a polynomial having a degree greater than the number of potential malicious parties.

5. The method according to claim 1 wherein each party receives a projection which is based upon an identity of said party and a parameter related to said party.

6. A method for giving each subsystem of an interconnected network the authority to issue information to parties of interconnected subsystems which permit said parties to authenticate each other, comprising:
    providing a polynomial having a plurality of variables at a central authority;
    providing to each subsystem a projection of said polynomial evaluated for one of said variables, said one variable representing an identifier for said subsystem;
    providing from each subsystem to each party connected to a subsystem a projection of said subsystem further evaluated for another of said variables representing said connected party's identification;
    evaluating remaining variables of said further evaluated projection with another party's identification when said another party attempts to initiate a session with said party, whereby a completely evaluated projection results defining a key; and,
    validating said key with a second key at said another party's location.

7. The method of claim 6 wherein said second key at said another party's location is generated by evaluating a projection received by said another party with respect to a second variable representing said first party identification.

8. The method of claim 7 wherein said first and second parties are connected to different subsystems, each of said parties further evaluating a respective projection using for an additional variable the identity of the other party's subsystem.

9. In a communication system interconnecting groups of parties providing intercommunication between parties of different groups, a method for authorizing parties of one group to communicate with parties of another group comprising:
    generating for each group independent multivariable functions, two of said variables representing the identity of parties which are to be interconnected;
    forwarding to each party of said groups projections of said functions which are partially evaluated for a party's identity, whereby each party has a projection representing each group;
    evaluating at a party's location of a first group desiring to communicate with a party of a second group, said second group's projection using the identity of said second group's party;
    evaluating at a second party's location of the second group said second group projection using the identity of said first group first party; and,
    validating the results of said first and second parties' evaluations.

10. A method for authenticating parties of one class connected by a communication network to parties of a second class comprising:
    computing a set of keys which may be used to encrypt data, and projections of said keys based on each party's name;
    distributing to said first class of said parties a subset of said keys;
    distributing said projections of said keys to said second class of parties evaluated for said parties' names;
    encrypting by a party of said first class a value of the name of a party of said second class from each key of said subset associated with said party of said first class, and combining the encryptions;
    combining said projections of said keys for a party of said second class, using said first class party's identity to generate a key;
    validating the combined encryption of said keys of said party of said first class with the key resulting from the combined values of the projections of said party of said second class.

11. A method for authentication according to claim 10 wherein each party of said first class each receive a different subset of keys.

12. A method for authentication according to claim 10, wherein said party of said second class identifies which of said party's projections of said second class relate to keys possessed by said party of said first class.

13. The method according to claim 10 wherein said parties of said second class receive said projections further encrypted by a party's password.

14. The method according to claim 10 wherein said validation results when said first and second party's evaluations are the same.

15. A system for authenticating parties of a common communication network comprising:
    a central administrator for selecting a multivariable function, at least two of said variables representing the identity of parties to a communication session;

a first memory at a network node connected to a first party for storing a projection of said function partially evaluated for said party's identification;

a second memory at a network node connected to a second party of a communication session, storing a projection of said function evaluated for said second party's identification;

means at said first node for evaluating a respective stored projection using the identity of said second party, whereby a first validation quantity is produced;

means at said second node for evaluating said projection of said second party using the identity of said first party, whereby a second validation quantity is produced; and, means for validating said first and second validation quantities, whereby the authority of said parties is verified.

16. The system of claim 15, wherein said means for validating said first and second quantities determines whether or not said quantities are equal.

17. The system of claim 16 wherein said user terminals combine said calculated set of keys, and said server encrypts with its keys said user terminals identification, and combines the result to derive a single common key known to both user terminal and server.

18. The system for authenticating a party according to claim 16, wherein said user terminal receives said projections password encrypted.

19. A system for authenticating parties connected to a server comprising:

a plurality of servers, each connected to receive a set of keys from a central administrator;

a plurality of sets of user terminals, each set of user terminals being connected to communicate with a respective plurality of servers;

a central administrator for supplying to each server a different set of keys for authenticating said connected user terminals, and for sending projections of said keys based on an identity associated with said user terminal to each user terminal, whereby each user terminal has a set of projections of a connected server's keys, permitting said user terminal to calculate a set of keys common to said connected server, identifying said user terminal as authorized to communicate with said server.

20. The system for authenticating a party according to claim 19 wherein said user receives said projections on a smart card which is read by said terminal.

* * * * *